(12) United States Patent
Ueda

(10) Patent No.: US 7,845,262 B2
(45) Date of Patent: *Dec. 7, 2010

(54) PROCESS AND APPARATUS FOR PRODUCING YARN AND GLAND PACKING

(75) Inventor: Takahisa Ueda, Hyogo (JP)

(73) Assignee: Nippon Pillar Packing Co., Ltd., Yodogawa-ku, Osaka-shi, Osaka (JP)

(*) Notice: Subject to any disclaimer, the term of this patent is extended or adjusted under 35 U.S.C. 154(b) by 152 days.

This patent is subject to a terminal disclaimer.

(21) Appl. No.: 12/087,902

(22) PCT Filed: Dec. 28, 2006

(86) PCT No.: PCT/JP2006/326198

§ 371 (c)(1),
(2), (4) Date: Jul. 17, 2008

(87) PCT Pub. No.: WO2007/083507

PCT Pub. Date: Jul. 26, 2007

(65) Prior Publication Data

US 2009/0000264 A1 Jan. 1, 2009

(30) Foreign Application Priority Data

Jan. 17, 2006 (JP) .............................. 2006-008564
Jan. 17, 2006 (JP) .............................. 2006-008565

(51) Int. Cl.
*D04C 1/06* (2006.01)

(52) U.S. Cl. ................................ 87/6; 87/7

(58) Field of Classification Search ...................... 87/6, 87/7; 66/190
See application file for complete search history.

(56) References Cited

U.S. PATENT DOCUMENTS

| 5,225,262 A * | 7/1993 | Leduc ....................... 428/75 |
| 5,339,520 A * | 8/1994 | Leduc ....................... 29/888.3 |
| 2009/0108534 A1* | 4/2009 | Ueda ......................... 277/537 |

FOREIGN PATENT DOCUMENTS

| JP | 61136794 | 6/1986 |
| JP | 62120996 | 6/1987 |
| JP | 63308275 | 12/1988 |
| JP | 3172382 | 7/1991 |
| KR | 910001830B | 3/1991 |

* cited by examiner

*Primary Examiner*—Shaun R Hurley
(74) *Attorney, Agent, or Firm*—Bacon & Thomas, PLLC

(57) ABSTRACT

A process for enabling a yarn formed by filling the interior of a tubular member configured by knitting or braiding a fibrous material with expanded graphite as a base material, to be produced in a state of a high productivity in order to enable the yarn to be actually used in an economical manner is provided. The process has: a fine cutting step of successively cutting an expanded graphite sheet which is continuously supplied in a state where the sheet has a predetermined width, to a small width along the width direction of the sheet; and a supplying and filling step of guiding and supplying a strip-like expanded graphite material which is produced by the fine cutting step, into the tubular member to be filled into the tubular member.

14 Claims, 11 Drawing Sheets

Fig. 3
(a) 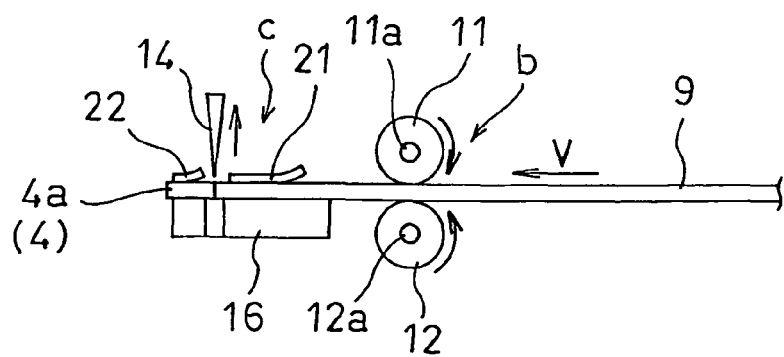
(b) 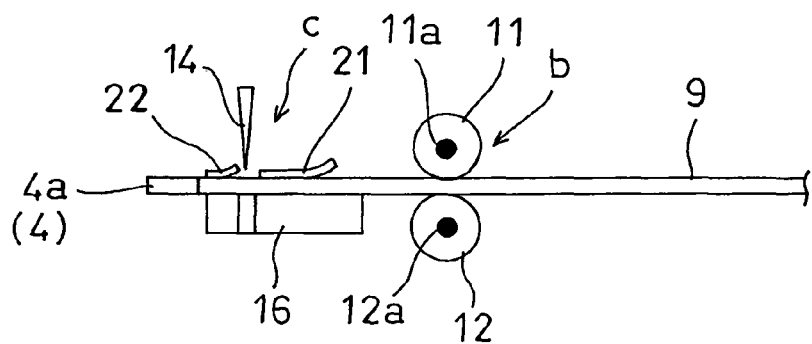
(c) 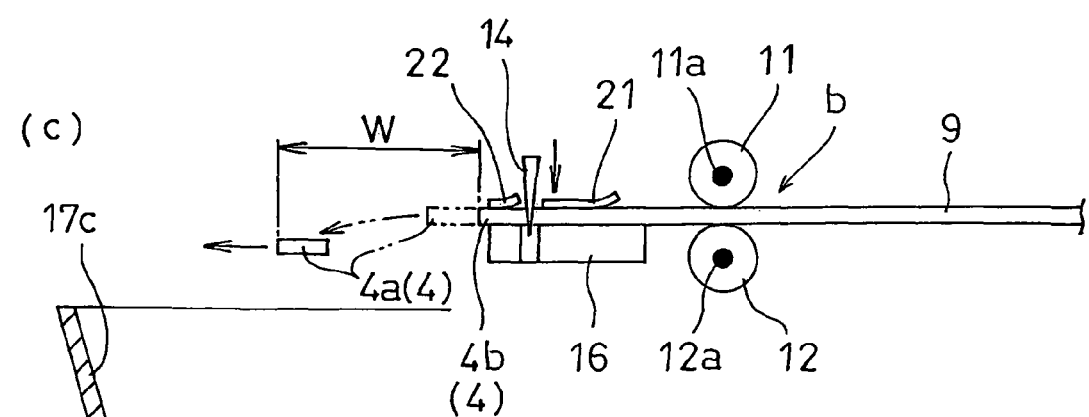
W = VT

Fig. 4
(a)
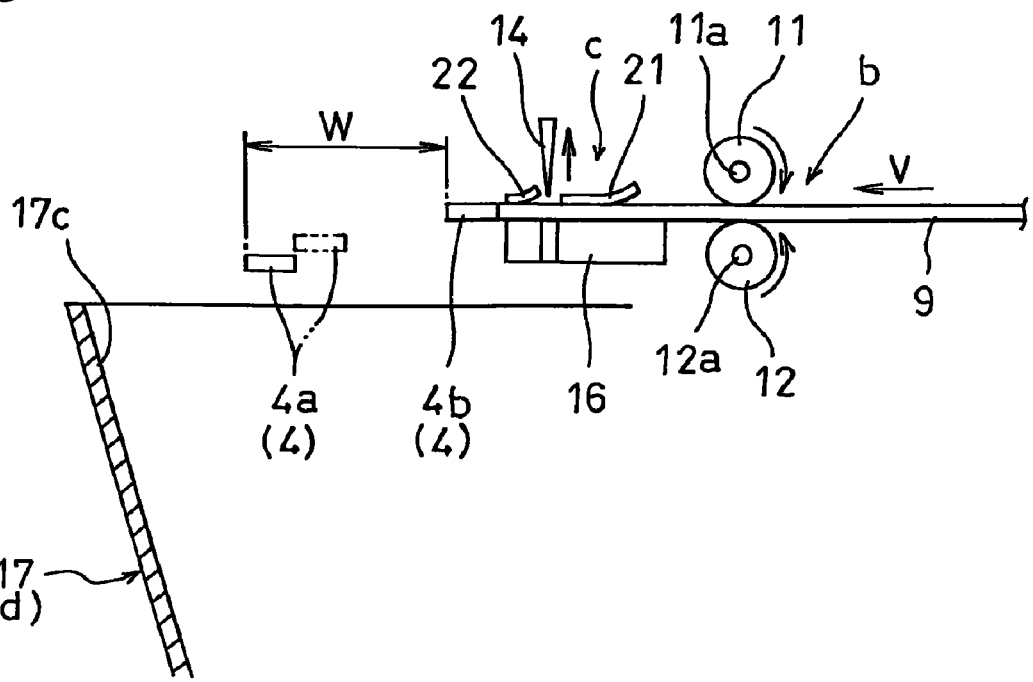
(b)
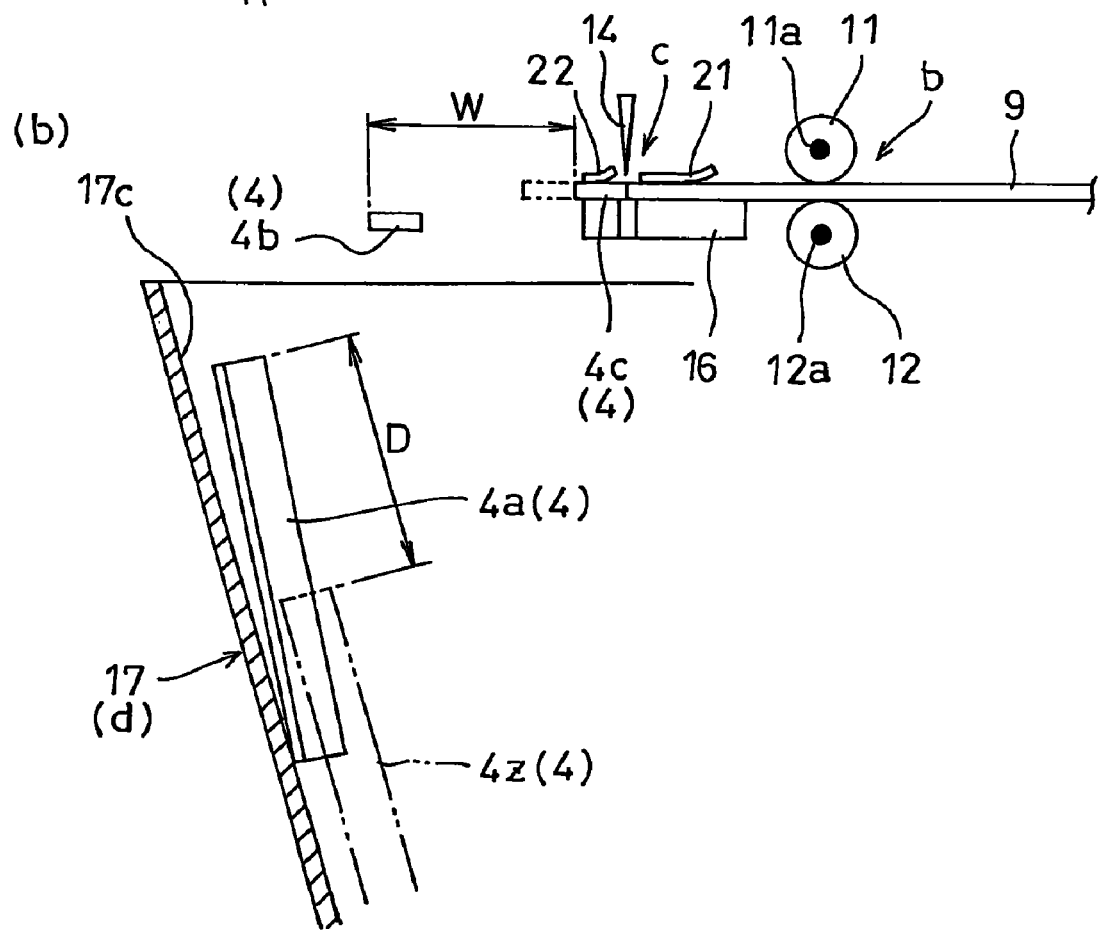

BENDABLE RADIUS r IN WIDTH DIRECTION   UNIT: mm

| t SHEET THICKNESS (mm) / h CUT WIDTH/THICKNESS | 0.25 | 0.38 | 0.50 |
|---|---|---|---|
| 1.5 | 10 | 10 | 10 |
| 2.0 | 10 | 10 | 10 |
| 3.0 | 15 | 25 | 20 |
| 4.0 | 30 | 40 | 60 |
| 5.0 | 80 | 105 | 120 | h: ASPECT RATIO

Fig. 11

COMPARISON TABLE OF CHARACTERISTICS

| | Conventional product 1 | Conventional product 2 | Conventional product 3 | Conventional product 4 | Conventional product 5 | Example 1 | Example 2 |
|---|---|---|---|---|---|---|---|
| Shifting distance of end portion | — | — | — | — | — | 20mm | 30mm |
| Section shape | Rectangular | Rectangular | Round | Round | Rectangular | Round | Round |
| Elongation (%) | 13 | 9 | 8 | 7 | 5 | 21 | 23 |
| Remarks | Note 1) | Note 1) | | | Note 2) | | |

Note 1) When elongated, breakage occurs in an expanded graphite tape disposed in the yarn.

Note 2) When elongated, a portion which is not filled with expanded graphite strips is produced.

Conveying speed : V
Width w of expanded graphite material 4    w = V · Th
Shifting distance D = α · V · T
         (α : Coefficient)

PROCESS AND APPARATUS FOR PRODUCING YARN AND GLAND PACKING

TECHNICAL FIELD

The present invention relates to a process and apparatus for producing a yarn, and a gland packing, and more particularly to a process and apparatus for producing a yarn which is to be used in a braided type gland packing, a string-like gasket, refractory cloth, or the like, and a gland packing which is produced by using the yarn produced by the production apparatus or the production process.

BACKGROUND ART

As a conventional art relating to a gland packing which is to be used in a shaft seal part of a fluid apparatus or the like, and a yarn used in the packing, known is a technique in which expanded graphite is used as a base material as disclosed in Japanese Patent Application Laying Open No. 63-1863 and Japanese Patent Publication No. 6-37546. This prior art discloses that a yarn for a gland packing is formed by filling the interior of a tubular member configured by braiding a fibrous material (knitting, hollow knitting, or the like), with a long expanded graphite sheet. A gland packing is produced by twisting or braiding using plural yarns which are thus produced (for example, eight-strand square braiding which uses eight yarns).

The conventional art which uses a thus configured yarn made of expanded graphite is conducted with the intention that, since the outer periphery of the expanded graphite base material is covered by knitting with a reinforcing material, or the like, the tubular member configured by braiding the reinforcing material counters a tensile or torsion force which is generated in each yarn when the gland packing is produced by braiding the plural yarns, and the expanded graphite base material in the tubular member is prevented from being broken.

As a manner of producing the yarn, as shown in Japanese Patent No. 2,562,603, only a concept of a production method or means that strip-like expanded graphite is introduced into a tubular member which is vertically directed, and a practical method of how to efficiently produce the yarn is not described.

DISCLOSURE OF THE INVENTION

Problems to be Solved by the Invention

It is an object of the invention to realize and provide a process and apparatus for enabling a yarn formed by filling the interior of a tubular member configured by knitting or braiding a fibrous material with expanded graphite as a base material, to be produced in a state of a high productivity in order to enable the yarn to be actually used in an economical manner, or namely a process and apparatus for producing a yarn. It is another object of the invention to obtain a gland packing of a high productivity by using a yarn produced by the improved process and apparatus for producing a yarn.

Means for Solving the Problems

The invention provides a process of producing a yarn formed by filling an interior of a tubular member configured by knitting or braiding a fibrous material with expanded graphite, wherein the process comprises: a fine cutting step of cutting an expanded graphite sheet which is continuously supplied in a state where the sheet has a predetermined width, to a small width along a width direction of the sheet; and a supplying and filling step of guiding and supplying a strip-like expanded graphite material which is produced by the fine cutting step, into the tubular member to be filled into the tubular member.

The invention is characterized in that, in the process of producing a yarn according to claim 1, in the fine cutting step, a cutting blade which extends in the width direction is reciprocally moved in a vertical direction with respect to a sheet surface of the expanded graphite sheet, thereby continuously cutting the expanded graphite sheet to produce the strip-like expanded graphite material.

The invention is characterized in that, in the process of producing a yarn, in the supplying and filling step, the strip-like expanded graphite material which is supplied through the fine cutting step is droppingly guided and supplied into the tubular member by using a funnel.

The invention is characterized in that, in the process of producing a yarn, in the supplying and filling step, the expanded graphite material which is supplied through the fine cutting step is droppingly guided and supplied into the tubular member in a sequence of supply, whereby a plurality of the expanded graphite materials are supplied into the tubular member in a state where end positions of the materials are shifted from one another by a predetermined distance in a longitudinal direction of the tubular member.

The invention is characterized in that, in the process of producing a yarn according, at least one of a speed of supplying the expanded graphite sheet to the fine cutting step, and a waiting time from an operation of cutting the expanded graphite sheet to a next cutting operation is variably adjusted, whereby at least one of the width of the ex-panded graphite material and the shifting distance of the end positions is variably adjusted.

The invention provides a gland packing characterized in that plural yarns which are produced by the yarn production process are bundled and twisted or braided to be configured into a string-like shape.

The invention provides an apparatus for producing a yarn formed by filling an interior of a tubular member configured by knitting or braiding a fibrous material with expanded graphite, wherein the apparatus has: an expanded graphite supplying mechanism which can continuously supply an expanded gra-phite sheet having a predetermined width; a conveying mechanism which conveys the expanded graphite sheet supplied from the expanded graphite supplying mechanism, toward a fine cutting mechanism; the fine cutting mechanism which can cut the expanded graphite sheet conveyed by the conveying mechanism, into small width portions along a width direction of the sheet; and a guiding and supplying mechanism which guides and supplies the strip-like expanded graphite material produced by the fine cutting mechanism, into the tubular member.

The invention is characterized in that, in the yarn producing apparatus, the expanded graphite supplying mechanism is configured by a structure where a reel around which a strip-like expanded graphite sheet is woundable is rotatably supported in a direction along which the expanded graphite sheet wound around the reel is unwoundable.

The invention is characterized in that, in the yarn producing apparatus, the conveying mechanism is configured by a structure where the expanded graphite sheet supplied from the expanded graphite supplying mechanism is clamped by a pair of rollers, and at least one of the rollers is driven to rotate.

The invention is characterized in that, in the yarn producing apparatus, the fine cutting mechanism is configured by a structure where a cutting blade which extends in the width direction is reciprocally moved in a vertical direction with respect to a sheet surface of the expanded graphite sheet.

The invention is characterized in that, in the yarn producing apparatus, the guiding and supplying mechanism is configured by a structure where a funnel in which a large-diameter upper end opening is placed in an end portion of the fine cutting mechanism, and a small-diameter lower end opening is placed in an upper end portion of the tubular member that is placed in a vertically directed posture is disposed.

The invention is characterized in that, in the yarn producing apparatus, the guiding and supplying mechanism is configured so that the expanded graphite material produced by the fine cutting mechanism is guided and supplied into the tubular member in a sequence of cutting, and a plurality of the expanded graphite materials are supplied into the tubular member in a state where end positions of the materials are shifted from one another by a predetermined distance in a longitudinal direction of the tubular member.

The invention is characterized in that, in the yarn producing apparatus, the apparatus comprises adjusting and setting means for variably adjusting and setting the width of the expanded graphite material and/or the shifting distance of the end positions, by variably adjusting a speed of conveying the expanded graphite sheet by the conveying mechanism, and/or a waiting time from an cutting operation in the fine cutting mechanism to a next cutting operation.

The invention provides a gland packing characterized in that plural yarns which are produced by the yarn producing apparatus are bundled and twisted or braided to be configured into a string-like shape.

EFFECTS OF THE INVENTION

According to the invention, since the process has the step of forming a small-width expanded graphite material by cutting an expanded graphite sheet having a predetermined width along the width direction of the sheet, the strip-like expanded graphite material can be continuously produced by continuing the fine cutting step, and the supplying and filling step of supplying the expanded graphite material into the tubular member is performed, whereby a yarn can be continuously produced. Namely, the process can be configured as a yarn production process which is suitable for mass production. A long expanded graphite sheet has a characteristic that the tensile strength in the width direction is superior to that in the longitudinal direction. Therefore, there is an advantage that it is possible to obtain a yarn having a mechanical strength which is superior than that obtained by a method where a longer expanded graphite material is formed by, for example, cutting an expanded graphite sheet along the longitudinal direction and then supplied to a tubular material.

Furthermore, a situation where a yarn is bent as in braiding or the like will be considered. Expanded graphite can be hardly expected to elongate. In the case where the abovementioned longer expanded graphite material is used, therefore, the situation can be coped with only by breaking of the expanded graphite material. Since the expanded graphite material in the invention has a strip-like shape, the material can follow bending deformation when adjacent materials are mutually moved. It is advantageous because a failure of breaking hardly occurs. As a result, it is possible to realize and provide a yarn production process in which a yarn formed by filling the interior of a tubular member configured by knitting or braiding a fibrous material with expanded graphite as a base material can be produced in a state where the yarn can be actually used in an economical manner and the productivity is excellent while the mechanical strength is made advantageous.

When, the expanded graphite sheet is finely cut in the fine cutting step by vertical movements of the cutting blade extending in the width direction with respect to the sheet surface, even the simple reciprocal movement of the cutting blade enables the operation of cutting the expanded graphite sheet to produce the strip-like expanded graphite material to be continuously performed. Therefore, it is possible to obtain a fine cutting step which is suitable for mass production.

According to the invention, when the supplying and filling step is configured so that the produced strip-like expanded graphite material is supplied into the tubular member by using a funnel, the process can be provided as a high-efficient and economical production process in which the fine cut expanded graphite material can be efficiently filled into the tubular member by using only a behavior that the expanded graphite material drops.

According to the invention, since the expanded graphite materials are supplied into the tubular member in the sequence of cutting in the fine cutting step, the length of the shifting between end positions of adjacent expanded graphite materials in the supply to the tubular member, i.e., the shifting distance can be set by using the interval between the cutting operation in the fine cutting step and the next cutting operation. Therefore, large-scale means for additionally disposing a dedicated step of setting the shifting distance is not required. Although the guiding and filling step is made simple and economical, the expanded graphite material can be supplied into the tubular member while forming shifting of a predetermined distance.

According to the invention, the width of the expanded graphite material and the shifting distance of the end positions of adjacent expanded graphite materials can be arbitrarily set by adjusting the speed of supplying the expanded graphite sheet to the fine cutting step, and/or the waiting time from the operation of cutting the expanded graphite sheet to the next cutting operation. Therefore, a large-scale facility for additionally disposing a dedicated step of adjusting and setting a shifting distance is not required. It is possible to provide a yarn production process in which, although the guiding and filling step is made simple and economical, the shifting distance of expanded graphite materials sup-plied into a tubular member can be arbitrarily adjusted and set, and which is convenient and easy to use.

According to the invention, by using a yarn which exerts any one of the effects of the above-described inventions, it is possible to produce and obtain a gland packing having an excellent sealing property.

According to the invention, because of means for cutting an expanded graphite sheet having a predetermined width along the width direction to form a small-width expanded graphite material, when the conveying mechanism and the cutting mechanism are continued to be operated, a strip-like expanded graphite material can be continuously produced, and, when the expanded graphite material is supplied into the tubular member, a yarn can be continuously produced. Namely, the apparatus can be configured as a yarn producing apparatus which is suitable for mass production. A long expanded graphite sheet has a characteristic that the tensile strength in the width direction is superior to that in the longitudinal direction. Therefore, there is an advantage that it is possible to obtain a yarn having a mechanical strength which is superior than that obtained by a method where a longer expanded graphite material is formed by, for example, cutting an expanded graphite sheet along the longitudinal direction and then supplied to a tubular material.

Furthermore, a situation where a yarn is bent as in braiding or the like will be considered. Expanded graphite can be hardly expected to elongate. In the case where a longer expanded graphite material is used, therefore, the situation can be coped with only by breaking of the expanded graphite material. Since the expanded graphite material in the invention has a strip-like shape, the material can follow bending deformation when adjacent materials are mutually moved. It is advantageous because a failure of breakage hardly occurs. As a result, it is possible to realize and provide a yarn production apparatus in which a yarn formed by filling the interior of a tubular member configured by knitting or braiding a fibrous material with expanded graphite as a base material can be produced in a state where the yarn can be actually used in an economical manner and the productivity is excellent while the mechanical strength is made advantageous.

When, the expanded graphite supplying mechanism is configured so that the expanded graphite sheet which is wound around the rotatable reel is supplied by unwinding rotation of the reel, the mechanism can be configured as a rational expanded graphite supplying mechanism which can hold a large amount of expanded graphite sheets, which is suitable for mass production, and which can be configured relatively economically. When, as in claim 9, the conveying mechanism is configured so that the expanded graphite sheet is clamped by a pair of rollers, and at least one of the rollers is driven to rotate, the mechanism can be configured as a conveying mechanism in which, although the structure is simple, a sure conveying function is obtained.

When, the fine cutting mechanism is configured so that the expanded graphite sheet is finely cut by vertical movements of the cutting blade extending in the width direction with respect to the sheet surface, a step of finely cutting an expanded graphite sheet to a strip-like expanded graphite material by the simple reciprocal movement of the cutting blade can be easily continued. Therefore, it is possible to obtain a fine cutting mechanism which is suitable for mass production. According to the invention set forth in claim 11, when the guiding and supplying mechanism is configured so that the strip-like expanded graphite material is supplied into the tubular member by using the funnel, the mechanism can be configured as a high-efficient and economical guiding and supplying mechanism in which the fine cut expanded graphite material can be efficiently filled into the tubular member by using only a behavior that the expanded graphite material drops.

According to the invention, when the guiding and supplying mechanism is configured so that the expanded graphite materials are supplied into the tubular member in the sequence of cutting in the fine cutting mechanism, the length of the shifting between end positions of adjacent expanded graphite materials in the supply to the tubular member, i.e., the shifting distance can be set by using the interval between the cutting operation in the fine cutting mechanism and the next cutting operation. Therefore, a large-scale configuration for additionally disposing dedicated means for setting the shifting distance is not required. Although the guiding and supplying mechanism is made simple and economical, the expanded graphite material can be supplied into the tubular member while forming shifting at a small step.

According to the invention, when the constituents of the conveying mechanism and the fine cutting mechanism are adjusted, the width and shifting distance of the expanded graphite material can be arbitrarily set, and this is convenient. It is possible also to produce a gland packing having an excellent sealing property, by using a yarn produced by the producing apparatuses of the invention.

BRIEF DESCRIPTION OF THE DRAWINGS

FIGS. 3(a) to 3(c) are functional diagrams showing a first half of the situation where the shifting distance is formed.

FIGS. 4(a) and 4(b) are functional diagrams showing a second half of the situation where the shifting distance is formed.

FIG. 8 is a view showing a comparison table of a width/thickness ratio and minimum bend radius of an expanded graphite material.

FIG. 11 is a view showing a comparison table of elongation characteristics between a conventional yarn and the yarn of the invention.

FIG. 12 is a view showing a diagrammatic operation time chart of a conveying mechanism and a fine cutting mechanism.

BEST MODE FOR CARRYING OUT THE INVENTION

Figure 5:
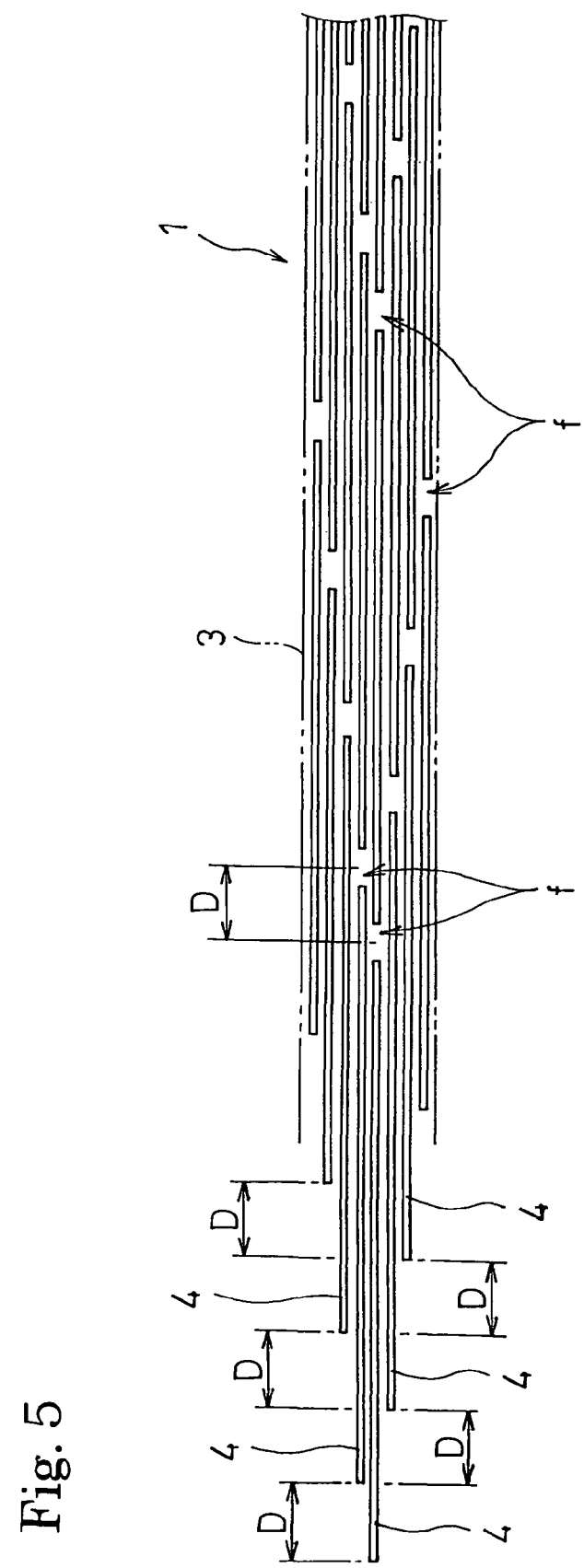
FIG. 5 is a diagram showing an arrangement situation of expanded graphite materials in the yarn.
Figure 6:
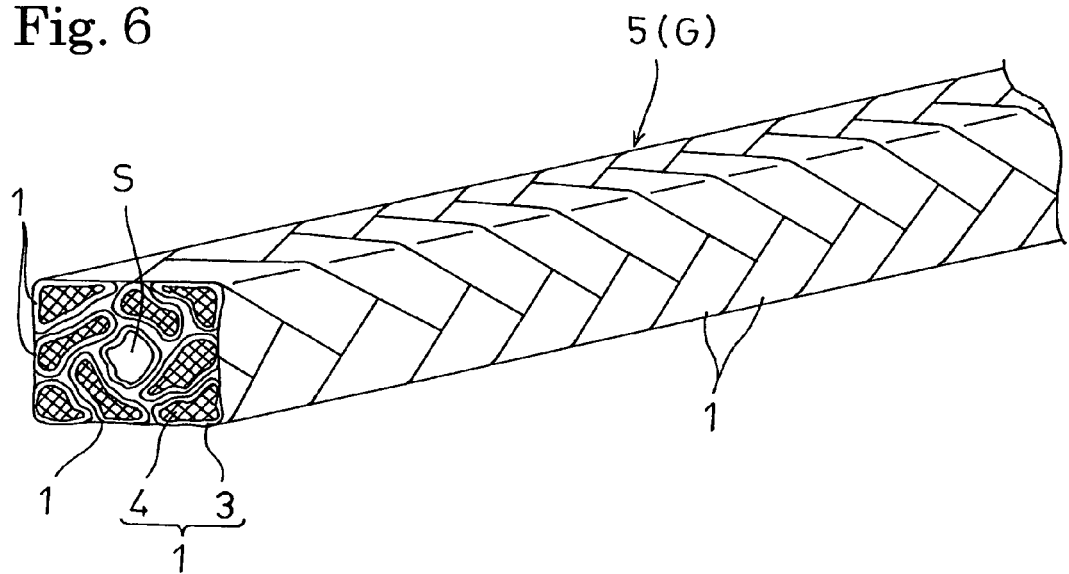
FIG. 6 is a perspective view showing a gland packing formed by braiding the yarn of FIG. 2.
Figure 7:
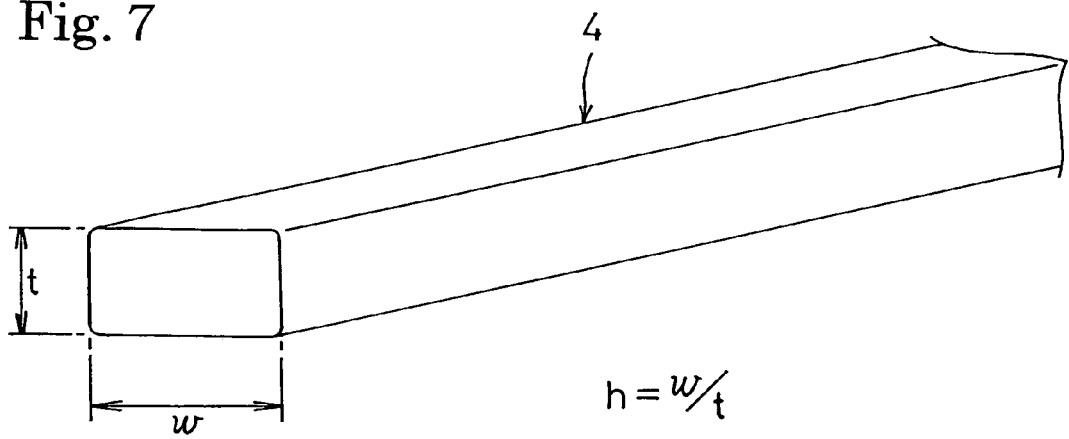
FIG. 7 is a view showing a section shape and dimension ratio of an expanded graphite material.
Figure 9:
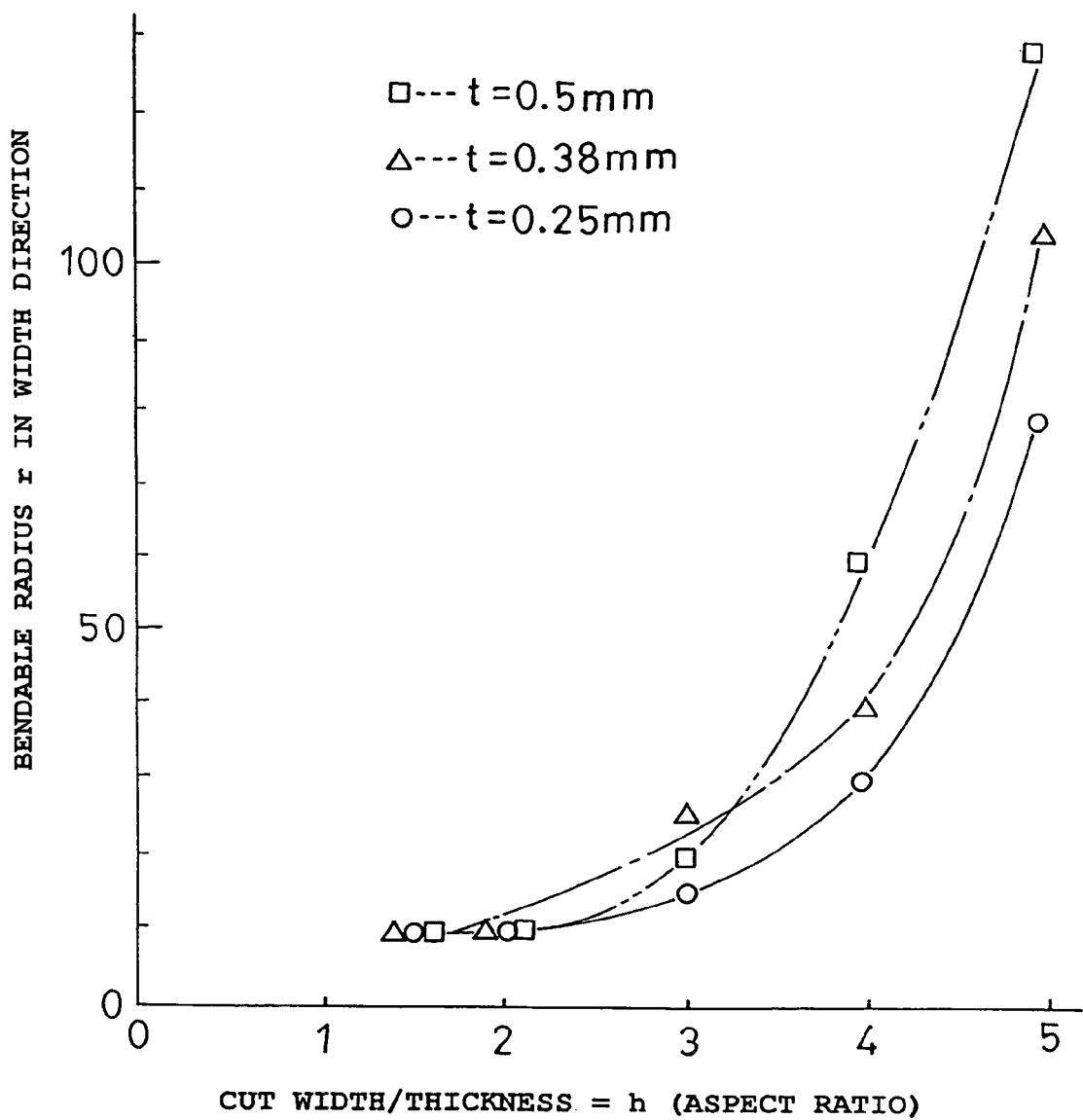
FIG. 9 is a view showing a correlation graph of a width/thickness ratio and minimum bend radius of an expanded graphite material.
Figure 10:
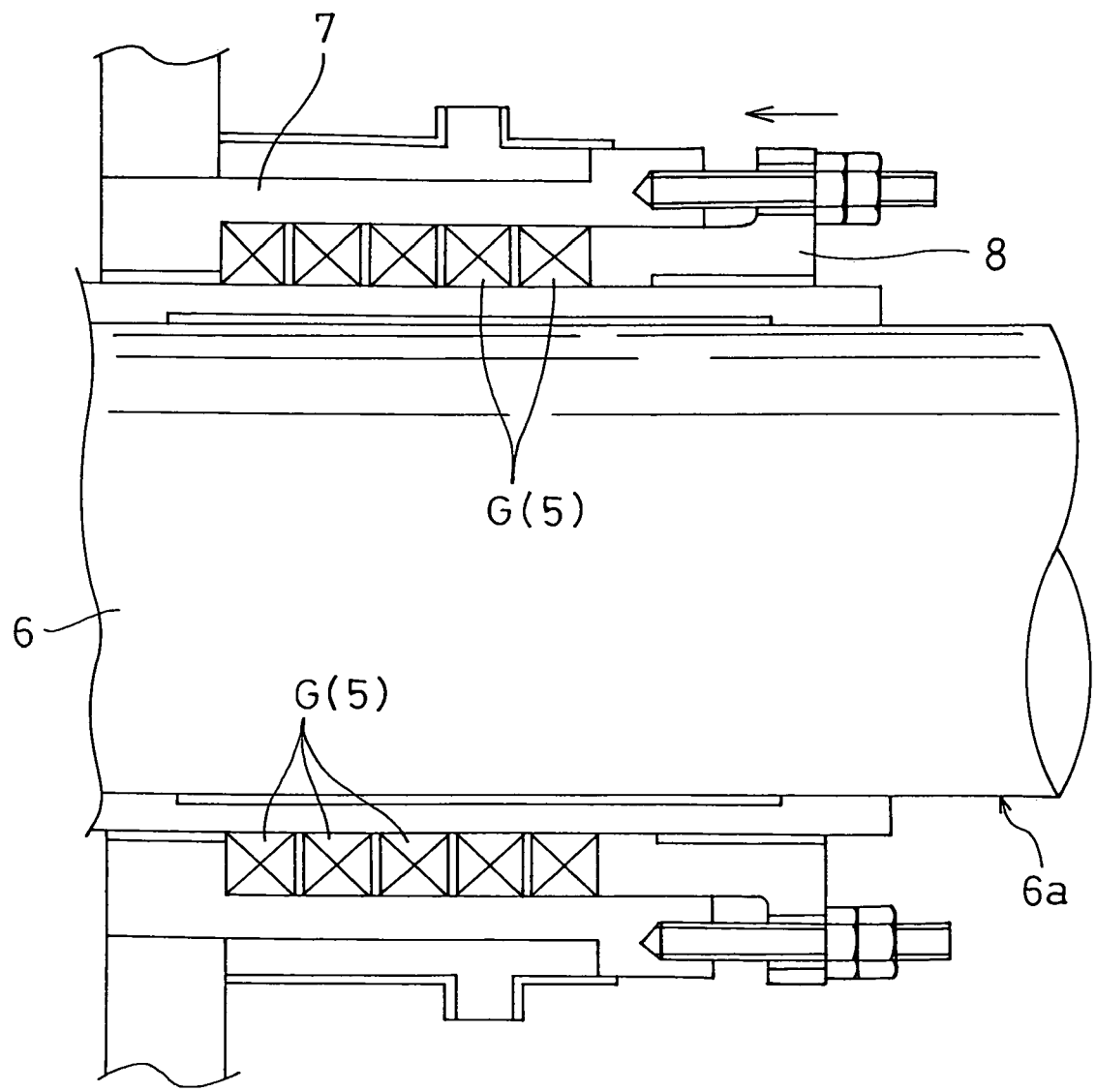
FIG. 10 is a section view of main portions showing an example of use of the gland packing.
Figure 1:
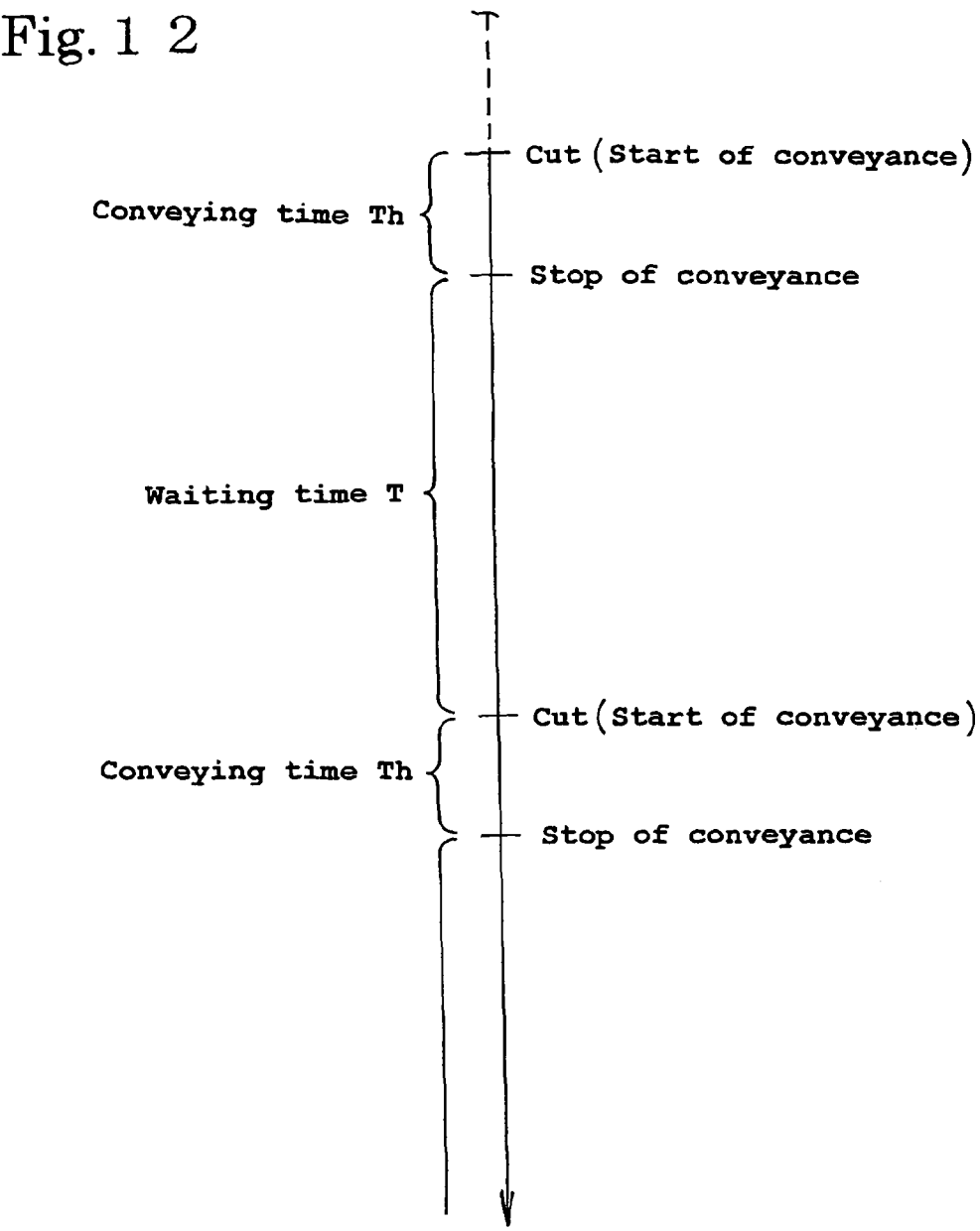

Hereinafter, embodiments of the yarn production process of the invention, the yarn producing apparatus which is a facility for the process, the yarn which is produced by the production process, and the gland packing which is produced by using the yarn will be described with reference to the drawings. FIGS. 1 to 4 are diagrams showing a yarn producing apparatus and a production process using it, FIG. 5 is a diagram showing an arrangement situation of expanded graphite materials in the yarn, FIG. 6 is a view showing a gland packing produced by using the yarn of FIG. 5, FIG. 7 is a view showing section dimensions of an expanded graphite material, FIGS. 8 and 9 are views showing correlation data of the aspect ratio and minimum bend radius of an expanded graphite material, FIG. 10 is a view showing an example of use of the gland packing, FIG. 11 is a view showing a data table relating to elongations of various yarns, and FIG. 12 is a time chart relating to a cutting operation and the like.

Figure 1:
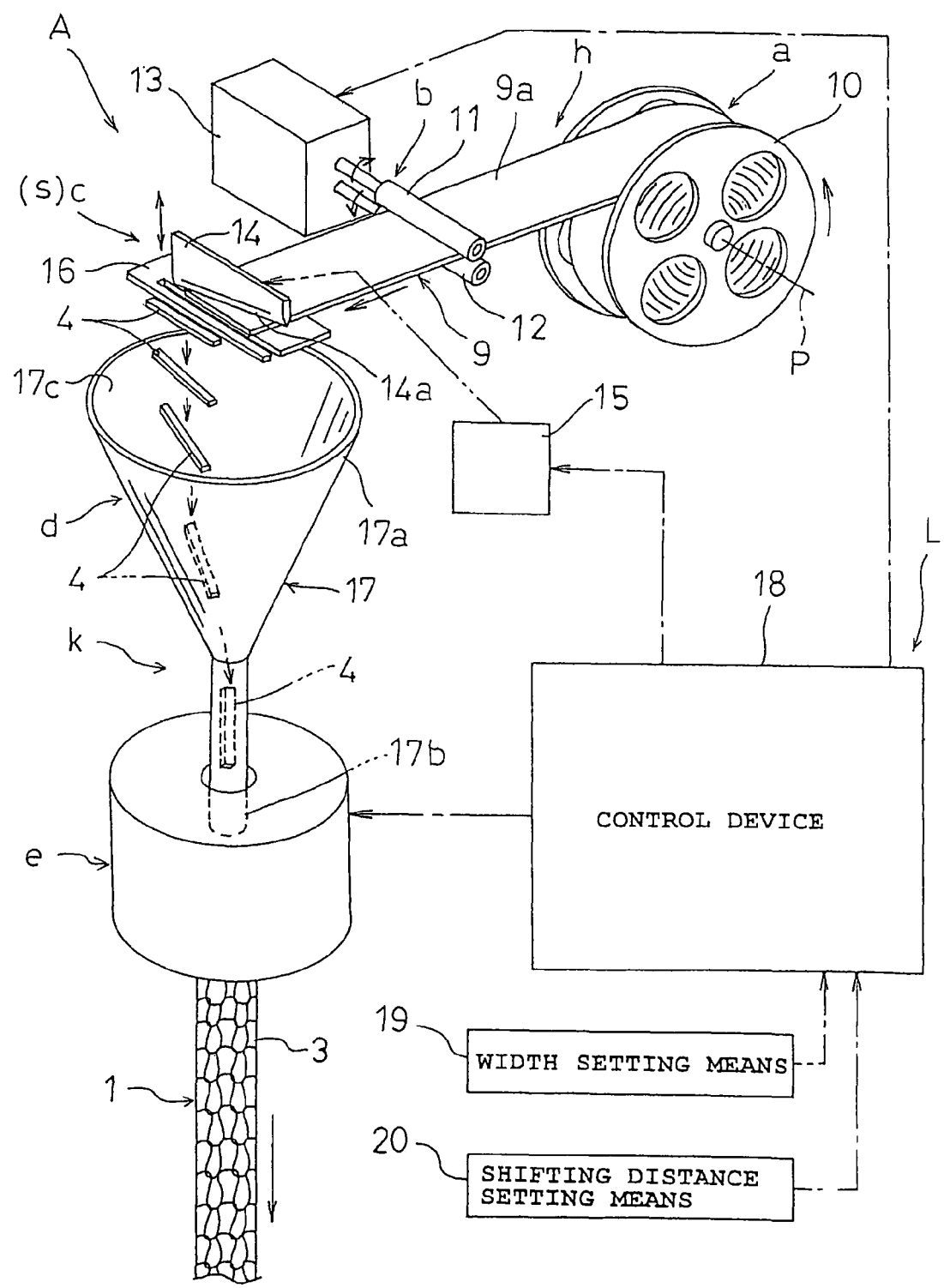
FIG. 1 is a diagram schematically showing a process of producing a yarn.

FIG. 1 shows a schematic configuration of a producing apparatus A for executing the yarn production process of the invention. The producing apparatus A is used for producing a yarn 1 formed by filling the interior of a tubular member 3 configured by knitting or braiding a fibrous material 2 with expanded graphite, and configured by: an expanded graphite supplying mechanism a which can continuously supply an expanded graphite sheet 9 having a predetermined width; a conveying mechanism b which conveys the expanded graphite sheet 9 supplied from the expanded graphite supplying mechanism a toward a fine cutting mechanism c; the fine cutting mechanism c which can continuously cut the expanded graphite sheet 9 conveyed by the conveying mechanism b, into small width portions along the width direction of the sheet; a guiding and supplying me-chanism d which guides and supplies the strip-like ex-panded graphite material (expanded graphite fibers) 4 produced by the fine cutting mechanism c, into the tubular member 3; and a knitting and braiding machine e which braids plural fibrous materials 2 to produce the tubular member 3.

The expanded graphite supplying mechanism a is configured by disposing a reel 10 around which the strip-like expanded graphite sheet 9 is woundable, so as to be rotatable about an axis P in both the forward and reverse directions. When the reel 10 is rotated in the direction of the arrow A1 shown in FIG. 1, therefore, the expanded graphite sheet 9 wound around it can be unwounded and taken out to be continuously supplied.

The conveying mechanism b is configured by a structure where the expanded graphite sheet 9 supplied from the expanded graphite supplying mechanism a is clamped by a pair of upper and lower rollers 11, 12, and at least one of the rollers 11, 12 is driven to rotate by a conveying driving portion 13. Namely, the expanded graphite sheet 9 is laterally transported in a horizontal direction, and the reel 10 is followingly rotated by the forced conveying of the expanded graphite sheet 9 by the conveying mechanism b, so as to unwind the expanded graphite sheet 9.

The fine cutting mechanism c is configured by: a cutting blade 14 which extends in the width direction of the expanded graphite sheet 9 that is conveyed in the horizontal direction; a fine cut driving portion 15 which reciprocally moves the blade in the vertical direction with respect to the sheet surface 9a of the expanded graphite sheet 9; and a table 16 which is a counterpart of the cutting blade 14. The reference numerals 21, 22 in FIGS. 3 and 4 denote pressing pieces which are used for guiding the expanded graphite sheet 9 and the expanded graphite material 4, and which are counterparts of the table 16. The cutting blade 14 is formed as a blade (so-called guillotine cutter) in which an edge 14a is angled with respect to the sheet surface 9a, and configured so as to, when is downward moved, sequentially cut the expanded graphite sheet 9 from one end in the width direction to the other end. As the fine cut driving portion 15 which reciprocally moves the cutting blade 14 in the vertical direction, various known structure are selectively set, and a detailed description thereof is omitted.

The guiding and supplying mechanism d is configured by disposing a funnel 17 in which a large-diameter upper end opening 17a is placed in an end portion of the fine cutting mechanism c, and a small-diameter lower end opening 17b is placed in an upper end portion of the tubular member that is placed in a vertically directed posture, and which is placed in a vertically directed posture. Namely, the guiding and supplying mechanism d functions so that the small-width strip-like expanded graphite material 4 produced by the fine cutting mechanism c is guided and supplied into the tubular member 3 in the sequence of cutting while dropping to bump against the funnel inner surface 17c which is inclined in a bowl-like manner, thereby changing the posture from the horizontal posture to the vertical posture. The guiding and supplying mechanism is configured so that plural expanded graphite materials 4 are supplied into the tubular member 3 in a state where end positions thereof are shifted from one another by a predetermined distance in the longitudinal direction of the tubular member 3, i.e., the vertical direction.

The tubular member 3 is braided by the knitting machine e so as to extend downward. The lower end opening 17b is inserted and placed in the knitting machine e, whereby it is configured so that the expanded graphite material 4 is filled into the tubular member 3 which is sequentially produced, to produce the yarn 1. A control device 18 which controls the driving states of the conveying mechanism b, the fine cutting mechanism c, and the knitting machine e, and width setting means (an example of adjusting and setting means) for setting the width of the expanded graphite material 4, and shifting distance setting means (an example of adjusting and setting means) 20 for setting the shifting distance of end portions of the expanded graphite materials 4 dispose the control device 18 to constitute a drive control unit L.

In the yarn production process by the producing apparatus A, the yarn 1 is produced through a conveying step h, a fine cutting step s, and a supplying and filling step k. In the conveying step h, the conveying driving portion 13 is driven to drivingly rotate the pair of rollers 11, 12 which clamp the expanded graphite sheet 9, and, in accordance with this, the reel 10 followingly rotate to unwind the expanded graphite sheet 9 which is wounded. The conveying speed V (see FIG. 3 and the like) by which the expanded graphite sheet 9 is conveyed to the fine cutting mechanism c can be arbitrarily controlled by controlling the rotational speed of the rollers 11, 12.

The fine cutting step s is a step of continuously cutting the expanded graphite sheet 9 which is continuously supplied in a state where the sheet has a predetermined width, to a small width along the width direction of the sheet. Specifically, the step performs a function of driving the fine cut driving portion 15 to cause the cutting blade 14 to repeat a downward cutting movement and an upward return movement (the cutting blade 14 is reciprocally moved in the vertical direction with respect to the sheet surface 9a of the expanded graphite sheet 9), whereby the expanded graphite sheet 9 which is conveyed is finely cut to the strip-like expanded graphite material 4 having a predetermined small width w. The expanded graphite material 4 which has been cut drops into the funnel 17 which is placed immediately below. The terms of "continuously cut to a small width" mean that the expanded graphite sheet 9 is sequentially finely cut by the cutting blade 14 through continuously operating the fine cutting mechanism c without stopping. The small width w can be arbitrarily increased or decreased by increasing or decreasing the driving speed of the mechanism. This may be defined by an expression of "intermittently cut at a small width", when the expanded graphite sheet 9 which is the cut side is considered as the base from the viewpoint of the structure of the fine cutting mechanism c.

Figure 2:
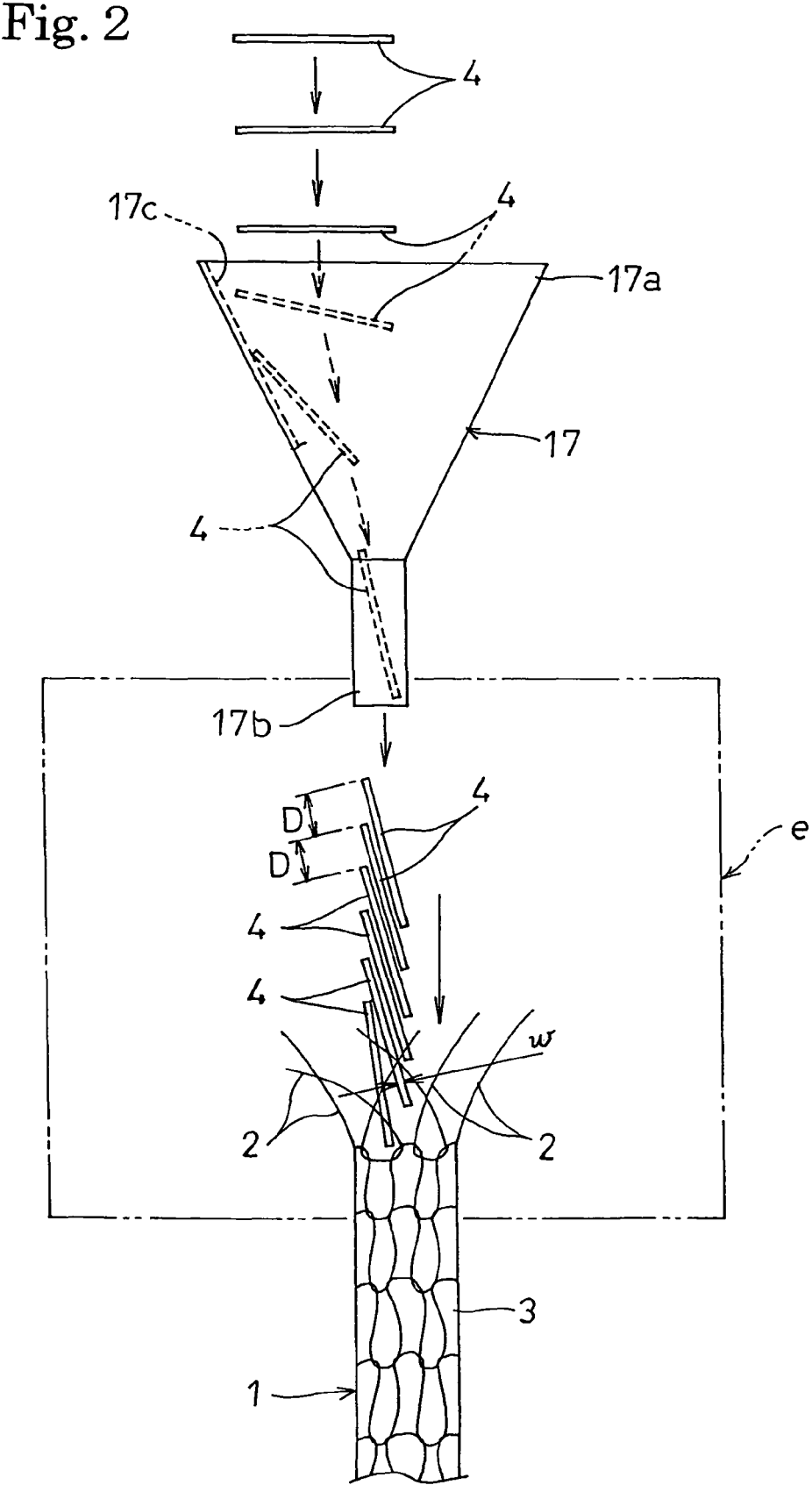
FIG. 2 is a functional diagram showing the whole of a situation where "shifting distance" is formed by a guiding and supplying mechanism.

The supplying and filling step k is a step of guiding and supplying the strip-like expanded graphite material 4 which is produced by the fine cutting step s, into the tubular member 3 to be filled thereinto. Specifically, the step performs a function that, as shown in FIGS. 1 and 2, the expanded graphite material 4 which is droppingly supplied through the fine cutting step s is received by the funnel inner surface 17c and then guided to the lower end opening 17b, and supplied to the tubular member 3 after the horizontal posture is changed to the vertical posture. The expanded graphite material is droppingly guided and supplied into the tubular member 3 in the sequence of supply, whereby the expanded graphite materials are supplied into the tubular member 3 in a state where end positions of adjacent expanded graphite materials 4, 4 are shifted from one another by a predetermined distance D in the vertical direction (the longitudinal direction of the tubular member 3).

As a result of the above steps of the yarn producing apparatus A (the production process), the expanded graphite sheet 9 which is wound around the reel 10 is finely cut to the small-width strip-like expanded graphite material 4, and a large number of expanded graphite materials 4 which are produced by the fine cutting are filled into the tubular member 3 which is being produced by the knitting machine e, by using the funnel 17, whereby the yarn 1 formed by filling the interior of the tubular member 3 configured by braiding the fibrous material 2 with the expanded graphite can be produced. Next, an embodiment of the yarn 1, and the control of the producing apparatus A will be described.

As shown in FIG. 3(a), first, the cutting blade 14 is raised and the driving of the conveying mechanism b is restarted, and the expanded graphite sheet 9 which has been stopped begins to be conveyed at the speed V (unit: mm/sec.). As shown in FIG. 3(b), when the sheet is conveyed by a distance w which set by the graphite width setting means 20, the conveying mechanism b is stopped. At this time, an expanded graphite material 4a which is already finely cut, and which exists at the tip end of the expanded graphite sheet 9 is horizontally pushed at the speed V and begins to jump. For the sake of convenience in description, the expanded graphite material 4 which is first cut is referred to as a first expanded graphite material 4a, and then in sequence as second and third expanded graphite materials 4b, 4c. A member which is already produced before the first expanded graphite material 4a is referred to as a 0-th expanded graphite material 4z. In FIGS. 3 and 4, it is assumed that the illustration in which shafts 11a, 12a of the rollers 11, 12 are indicated by a hollowed circle means a state where they are rotated, and that in which the shafts are indicated by a solid circle means a state where their rotation is stopped.

As shown in FIG. 3(c), next, the cutting mechanism c is driven, and the cutting blade 14 which is at an upper waiting position is downward moved to finely cut (cut) a tip end portion of the expanded graphite sheet 9 at the width w to produce the next expanded graphite material 4b. At this time, the expanded graphite material 4a which jumps at the speed V is in a state where it has flown by a horizontal distance W although it is caused to slightly fall by the acceleration of gravity G. When a waiting time (time lag) between the cutting by the cutting blade 14 to the next cutting is indicated by T (unit: second), namely, the flying distance W of the expanded graphite material 4a during the waiting time is W=VT, and this equals to the horizontal gap between the adjacent expanded graphite materials 4a, 4b in the step of producing the expanded graphite material. However, the study is made on the assumption that the cutting operation by the cutting blade 14 is conducted instantly (time 0).

FIG. 4(a) shows a state where the pushing on the second expanded graphite material 4b by the expanded graphite sheet 9 is completed, and the material begins to singly jump. In this state, the first expanded graphite material 4a is slightly moved from the state of FIG. 3(c), and the horizontal gap with respect to the second expanded graphite material 4b equals to the above-mentioned flying distance W. When the next cutting operation is performed to produce the third expanded graphite material 4c, the horizontal gap between the second adjacent expanded graphite material 4b and the third expanded graphite material 4c is W as shown in FIG. 4(b). At this time, "shifting distance" between an end portion of the first expanded graphite material 4a which is slidingly moved along the inner surface 17c of the funnel 17, and that of the 0-th expanded graphite material 4z which is already produced is $D=\alpha W(=\alpha VT)$.

In the above, $\alpha$ is a coefficient. The coefficient $\alpha$ is an element which is used for converting the horizontal gap W to the vertical shifting distance in the tubular member 3, and which is determined by the specifications of the system such as the guiding and supplying mechanism d. As in this case, the horizontal distance W and the coefficient $\alpha$ are determined by various factors such as an operation of amplifying the gap by the acceleration of gravity according to the height between the cutting position and the tubular member 3, and the frictional resistance due to the sliding down on the funnel inner surface 17c, and a detailed description thereof is omitted. The actual shifting distance D is set to 20 to 30 mm as described later, or another value.

The horizontal gap W between adjacent expanded graphite materials, i.e., the shifting distance D is determined by the conveying speed V of the expanded graphite sheet 9, and the waiting time T [approximately the time from the state of FIG. 3(b) to that of FIG. 4(a), and more correctly see FIG. 12] of the cutting blade 14. In the case where the conveying speed V is high and the waiting time T is long, for example, "shifting distance D" is large, and, in the case where the conveying speed V is low and the waiting time T is short, "shifting distance D" is small. Furthermore, the case where the conveying speed V is high and the waiting time T is short, and that where the conveying speed V is low and the waiting time T is long may be possible. By the adjustment of the two factors, i.e., by the shifting distance setting means 20, the shifting distance D can be variably set in an arbitrary manner.

A multiplication (Vth) of a conveying time Th [about the time required for transition from the state of FIG. 3(a) to that of FIG. 3(b), and more correctly see FIG. 12] which is a time zone immediately before the beginning of the waiting time T by the conveying speed V equals to the width w of the expanded graphite material 4. The conveying time Th and the conveying speed V are set by the width setting means 19, and, in accordance with this, the width w of the expanded graphite material 4 is determined. The conveying speed V can be set by both the width setting means 19 and the shifting distance setting means 20. Therefore, conditions may be preferably set so that, for example, the setting speed of the first operated one of the two means is preferentially set.

For reference, FIG. 12 shows a diagrammatic time chart of the fine cutting operation by the fine cutting mechanism c. In FIG. 12, with setting a certain time during the cutting operation as the origin, the sequence of operations relating to the driving and stopping of the conveying mechanism b and the cutting mechanism c are shown in time sequence. The cutting operation is drawn assuming that, as described above, it does not require a time or is conducted instantly. As seen from the time chart, when the conveying speed V is fixed, the width w of the expanded graphite material 4 is determined by the conveying time Th, and the shifting distance D is determined by the waiting time T.

Next, the shape and characteristics of the yarn 1 produced by the above-described yarn production process, several examples, and a gland packing 5 (G) produced by using the yarn 1 will be described.

As shown in FIGS. 1, 2, and 5, the yarn 1 for a gland packing which is produced by the production process using the above-described production apparatus A is formed by filling the interior of the tubular member 3 configured by knitting or braiding the fibrous material 2 with a large number of strip-like expanded graphite materials 4 in a state where end positions of the materials are shifted from one another by the predetermined distance D in the longitudinal direction of the expanded graphite materials. In the section shape of the expanded graphite material 4, preferably, an aspect ratio h which is a value obtained by dividing the width by the thickness is set to 1 to 5 ($1 \leq h \leq 5$). As shown in FIG. 7, the aspect ratio h is a value ($h=w/t$) which is obtained by dividing the width w by the thickness t in the section dimensions of the expanded graphite material 4. The section shape of the expanded graphite material 4 may be a shape other than a rectangle, such as a circle, an ellipse, or an oval.

As shown in FIG. 2, for example, the expanded graphite materials 4 are introduced into the tubular member 3 which is vertically directed, in a state where end positions thereof are shifted from one another by D in the vertical direction, thereby forming the yarn 1 in a state where the interior of the tubular member 3 is filled with a large number of expanded graphite materials 4 in a state where end positions thereof are shifted from one another by D as shown also in FIG. 5. In this case, as shown in FIG. 5, interrupted portions f which are gaps between the expanded graphite materials 4 that are adjacent in the longitudinal direction of the yarn are shifted from one another by D. Therefore, there is an advantage that a phenomenon that many interrupted portions f are concentrated in a certain place in the longitudinal direction of the yarn and the mechanical strength of the yarn 1 in the portion is reduced hardly or does not occur. For the sake of convenience, the interrupted portions f are exaggeratedly drawn in FIG. 5.

In FIGS. 8 and 9, with respect to 15 samples (yarns 1) in total of 3 kinds of the thickness t of the expanded graphite material 4, or 0.25 mm, 0.38 mm, and 0.50 mm, and 5 kinds of the aspect ratio h, or 1.5, 2, 3, 4, and 5, the bendable radius in the lateral direction was measured to obtain data. In this case, "bendable radius" means the minimum radius at which the expanded graphite material 4 can be bent in a normal state where the graphite does not break, crack, nor protrude from the outer fibrous material 2. A use manner in which the expanded graphite material 4 having the thickness t of 0.25 mm is suitable as a yarn for a small-diameter gland packing, graphite of 0.38 mm is suitable as a yarn for a popular type of gland packing, and graphite of 0.50 mm is suitable as a yarn for a large-diameter gland packing may be possible.

As seen from the table of FIG. 8 and the graph of FIG. 9, when the aspect ratio h of the expanded graphite material 4 is 5 or less, a minimum bend radius which is practically durable is obtained, and it is known that, when the aspect ratio h is 3 or less, the minimum bend radius is extremely reduced. Therefore, it is preferable that the range of the aspect ratio h is set to a range of 1.0 to 3.0 ($1.0 \leq h \leq 3.0$). In the case where h is 1, when the thickness is 0.25 mm, also the width is 0.25 mm, and it is difficult to perform physical breaking. In view of the actual situation of a breaking work, therefore, it seems that the setting where the lower limit of the aspect ratio h is set to 1 is realistic. From the experimental data of FIGS. 8 and 9, it is preferable to use the yarn 1 in which the aspect ratio h is in the range of 1.5 to 3.0.

The gland packing 5 shown in FIG. 6 is configured into a string-like shape by bundling eight (an example of a plural number) yarns 1 described above in the periphery of a core member S (the core member S may be omitted), and twisting or braiding (eight-strand square braiding or the like) the bundled yarns. The shape is continuously rounded to be compression-molded, whereby a gland packing G in which a section has a rectangular shape, and the whole shape has a doughnut-like annular shape can be formed. As shown in FIG. 10, for example, the gland packing G is attached to a packing box 7 in a state where plural gland packings are arranged in the axial direction of a rotation shaft 6, and pressed by a packing cover 8 in the axial direction, thereby enabling the packing to exert a sealing function on the outer peripheral face 6a of the rotation shaft 6.

Example 1 of Yarn

A yarn of Example 1 is produced in the following manner by using the above-described production process. A large number of expanded graphite materials 4 which have a rectangular section shape of a thickness (t) of 0.38 mm×a width (w) of 1.0 mm, and which have a length of about 200 mm are inserted into the tubular member 3 configured by braiding (knitting) using an Inconel wire (or a stainless steel wire or the like) having a diameter of about 0.1 mm serving as the fibrous material 2, with shifting positions of their end portions from one another by 20 mm, thereby forming the yarn 1 having a circular (round) section shape. In the example, namely, the shifting D between end portions of the expanded graphite materials 4, 4 is set to D=20 mm. In the first yarn 1 of Example 1, the aspect ratio h of the expanded graphite material 4 was $h=1.0/0.38 \approx 2.63$, and the weight was 5 g/m.

FIG. 3 shows the gland packing 5 configured by using the yarn 1 of Example 1. The gland packing 5 was produced by braiding (eight-strand square braiding or the like) eight yarns 1 of Example 1, and then applying expanded graphite over the surface, thereby producing the gland packing 5 having a square section of 8 mm in length and 8 mm in width.

Example 2 of Yarn

A yarn of Example 2 is produced in the following manner by using the above-described production process. The expanded graphite materials 4 having a section size of a thickness of 0.38 mm, a width of 1.0 mm, and a length of 200 mm are bundled with shifting their end portions from one another by 30 mm, thereby forming a long product. The outer periphery of the product is covered by the tubular member 3 configured by knitting the fibrous material 2 configured by an Inconel wire having a diameter of 0.1 mm, thereby forming the yarn 1 having a circular (round) section shape. In the example, namely, the shifting distance D between end portions of the expanded graphite materials 4, 4 is set to D=30 mm. In the second yarn 1 of Example 2, the aspect ratio h of the expanded graphite material 4 was $h=1.0/0.38 \approx 2.63$, and the weight was 4 g/m.

Eight yarns 1 of Example 2 were braided, and expanded graphite was then applied over the surface, thereby producing the gland packing 5 having a square section of 6.5 mm in length and 6.5 mm in width (see FIG. 3).

FIG. 11 shows a comparison table of characteristics between the above-described yarns of Examples 1 and 2 and yarns of Conventional products 1 to 5 having a conventional structure. The conventional products are schematically configured in the following manner. The yarn of Conventional product 1 has a structure in which plural expanded graphite sheets having a small width are stacked and the outer periphery of the stack is reinforced by a fiber. The yarn of Conventional product 2 has a structure in which the outer periphery of a string-like member configured by folding an expanded graphite tape having a large width is reinforced by a fiber. The yarn of Conventional product 3 has a structure in which an expanded graphite tape having a large width reinforced by a fiber is folded or heated. The yarn of Conventional product 4 has a structure in which the outer periphery of the yarn of Conventional product 3 is further reinforced by a fiber. The yarn of Conventional product 5 has a structure in which a tubular member formed by a fiber is filled with a strip-like expanded graphite sheet.

From the comparison table of characteristics of FIG. 11, it can be seen that the elongations of the yarns 1 of Examples 1 and 2 are definitely superior to all of the yarns of Conventional products 1 to 5, and show a high-level performance. This extensive improvement in elongation eliminates the failure that, when plural yarns 1 are braided in order to produce a gland packing, the expanded graphite material 4 cannot follow bending and is broken. Therefore, the sealing property of a gland packing is not reduced, and an excellent sealing property is exhibited for a long term.

In a yarn of a conventional product, expanded graphite (expanded graphite sheets, expanded graphite tapes) are randomly introduced and filled into a tubular member. Therefore, interrupted portions (see the interrupted portions f in FIG. 5) which are gaps between expanded graphites that are adjacent in the longitudinal direction of the yarn are eccentrically placed. In some cases, for example, many interrupted portions are concentrated in a certain place, and the density of expanded graphite in the longitudinal direction of the yarn is easily uneven. This causes mechanical elongation to easily become uneven. Therefore, it is considered that, when a yarn is twisted or bent, there occurred a failure that expanded graphite is relatively easily broken in a portion of less elongation.

By contrast, in the yarn 1 of Examples 1, 2, many strip-like expanded graphite materials filled into the tubular member 3 are configured so that positions of end portions are evenly shifted in the longitudinal direction of the yarn. Therefore, the places of the interrupted portions f are evenly distributedly placed in the longitudinal direction (also in the lateral direction) of the yarn 1 as described above, and the density of the expanded graphite materials 4 in the tubular member 3 is further uniformalized. As a result, the response to elongation due to slippage between expanded graphites is uniformalized irrespective of the position in the longitudinal direction of the yarn, and therefore substantially improved (see FIG. 11), so that the yarn 1 can be twisted or braided without breaking the expanded graphites.

From the above, the yarn 1 of Examples 1, 2, and the gland packing 5 configured by it have the following advantages. 1. When the number of expanded graphite materials is changed, a yarn having an arbitrary thickness can be produced. 2. Sliding between expanded graphite materials is excellent, and hence expanded graphite is not broken, and can largely elongate. 3. A section of a fiber bundle is easily deformed to a round shape, and hence the adhesiveness to a reinforcing material is excellent, and bending easily occurs. 4. A long material is not used, and therefore production can be easily performed. 5. A yarn can be produced without using an adhesive agent.

Other Examples

The fine cutting mechanism c for performing the fine cutting step s may have any structure as far as it can cut the expanded graphite sheet 9 along the width direction. Therefore, a structure other than the illustrated one which uses the cutting blade 14 may be employed. The conveying mechanism b for performing the conveying step h, and the guiding and supplying mechanism d for performing the supplying and filling set k may have a structure other than the illustrated ones. Also the expanded graphite supplying mechanism a, the conveying mechanism b, and the guiding and supplying mechanism d may have a structure other than the illustrated ones.

The invention claimed is:

1. A process of producing a yarn formed by filling an interior of a tubular member configured by knitting or braiding a fibrous material with expanded graphite, process comprises the steps of:
    a fine cutting step of cutting an expanded graphite sheet which is continuously supplied in a state where the sheet has a predetermined width, to a small width along a width direction of the sheet; and
    guiding and supplying a strip-like expanded graphite material which is produced by said fine cutting step, into the tubular member to be filled into the tubular member.

2. The process of producing a yarn according to claim 1, wherein, in said fine cutting step, a cutting blade which extends in the width direction is reciprocally moved in a vertical direction with respect to a sheet surface of the expanded graphite sheet, thereby continuously cutting the expanded graphite sheet to produce the strip-like expanded graphite material.

3. The process of producing a yarn according to claim 1, wherein:
    in said guiding and supplying step, the strip-like expanded graphite material which is supplied through said fine cutting step is droppingly guided and supplied into the tubular member by using a funnel.

4. The process of producing a yarn according to claim 1, wherein:
    in said guiding and supplying step, said expanded graphite material which is supplied through fine cutting step is droppingly guided and supplied into the tubular member in a sequence of supply, whereby a plurality of the expanded graphite materials are supplied into the tubular member in a state where end positions of the materials are shifted from one another by a predetermined distance in a longitudinal direction of the tubular member.

5. The process of producing a yarn according to claim 4, wherein:
    at least one of: a speed of guiding and supplying the expanded graphite sheet to said fine cutting step, and a waiting time from an operation of cutting the expanded graphite sheet to a next cutting operation is variably adjusted, whereby at least one of the width of the expanded graphite material and the shifting distance of the end positions is variably adjusted.

6. A gland packing having a plurality of yarns which are produced by the process according to the process of yarn production according to claim 1, said plurality of yarns being bundled and twisted or braided to configure said gland packing into a string-like shape.

7. An apparatus for producing a yarn formed by filling an interior of a tubular member configured by knitting or braiding a fibrous material with expanded graphite,
    the apparatus comprising:
    an expanded graphite supplying mechanism which can continuously supply an expanded graphite sheet having a predetermined width;
    a conveying mechanism which conveys said expanded graphite sheet supplied from said expanded graphite supplying mechanism toward a fine cutting mechanism, said fine cutting mechanism cuts said expanded graphite sheet conveyed by said conveying mechanism, into small width portions along a width direction of said sheet; and a guiding and supplying mechanism which guides and supplies said strip-like expanded graphite material produced by said fine cutting mechanism, into said tubular member.

8. The apparatus for producing a yarn according to claim 7, wherein:
said expanded graphite supplying mechanism is configured by a structure where a reel around which a strip-like expanded graphite sheet is wound is rotatably supported in a direction along which said expanded graphite sheet wound around said reel is unwoundable.

9. The apparatus for producing a yarn according to claim 7, wherein:
said conveying mechanism is configured by a structure where said expanded graphite sheet supplied from said expanded graphite supplying mechanism is clamped by a pair of rollers, and at least one of said rollers is driven to rotate.

10. The apparatus for producing a yarn according to claim 7, wherein:
said fine cutting mechanism is configured by a structure where a cutting blade which extends in the width direction is reciprocally moved in a vertical direction with respect to a sheet surface of said expanded graphite sheet.

11. The apparatus for producing a yarn according to claim 7, wherein:
said guiding and supplying mechanism is configured by a structure where a funnel in which a large-diameter upper end opening is placed in an end portion of said fine cutting mechanism, and a small-diameter lower end opening is placed in an upper end portion of said tubular member that is placed in a vertically directed posture is disposed.

12. The apparatus for producing a yarn according to claim 7, wherein:
said guiding and supplying mechanism is configured so that said expanded graphite material produced by said fine cutting mechanism is guided and supplied into said tubular member in a sequence of cutting; and
a plurality of said expanded graphite materials are supplied into said tubular member in a state where end positions of said materials are shifted from one an-other by a predetermined distance in a longitudinal direction of said tubular member.

13. The apparatus for producing a yarn according to claim 12, further comprising:
adjusting and setting means for variably adjusting and setting the width of said expanded graphite material and/or the shifting distance of the end positions, by variably adjusting a speed of conveying said expanded graphite sheet by said conveying mechanism, and/or a waiting time from an cutting operation in said fine cutting mechanism to a next cutting operation.

14. A gland packing having a plurality of yarns which are produced by the process according to claim 1 and the yarn producing apparatus comprising: an expanded graphite supplying mechanism which can continuously supply an expanded graphite sheet having a predetermined width; a conveying mechanism which conveys said expanded graphite sheet supplied from said expanded graphite supplying mechanism toward a fine cutting mechanism, said fine cutting mechanism cuts said expanded graphite sheet conveyed by said conveying mechanism, into small width portions along a width direction of said sheet; and a guiding and supplying mechanism which guides and supplies said strip-like expanded graphite material produced by said fine cutting mechanism, into said tubular member, said plurality of yarns being bundled and twisted or braided to configure said gland packing into a string-like shape.

* * * * *